United States Patent [19]
Elliott et al.

[11] Patent Number: 5,130,561
[45] Date of Patent: Jul. 14, 1992

[54] SWITCHING MODE POWER SUPPLIES WITH CONTROLLED SYNCHRONIZATION

[75] Inventors: Brent A. Elliott, Plano; C. Lee Marusik, Allen; Edward D. Johnson, Plano, all of Tex.

[73] Assignee: Alcatel Network Systems, Inc., Richardson, Tex.

[21] Appl. No.: 574,974

[22] Filed: Aug. 29, 1990

[51] Int. Cl.$^5$ .............................................. H02M 3/28
[52] U.S. Cl. ........................................ 307/31; 363/72; 363/56; 323/272; 323/284
[58] Field of Search ................ 323/272, 282, 284; 307/11, 31; 363/56, 71, 72

[56] References Cited

U.S. PATENT DOCUMENTS

| | | | |
|---|---|---|---|
| 3,562,545 | 2/1971 | Rubner | 307/87 |
| 3,764,889 | 10/1973 | Nowell | 323/17 |
| 4,171,517 | 10/1979 | Higa et al. | 328/72 |
| 4,520,275 | 5/1985 | Marusik | 307/64 |
| 4,533,836 | 8/1985 | Carpenter et al. | 307/11 |
| 4,779,184 | 10/1988 | White | 363/65 |
| 4,825,144 | 4/1989 | Alberkrack et al. | 323/272 |
| 4,916,329 | 4/1990 | Dang et al. | 307/66 |
| 4,956,563 | 9/1990 | Schornack | 307/66 |
| 5,029,269 | 7/1991 | Elliott et al. | 363/21 |

Primary Examiner—Steven L. Stephan
Assistant Examiner—Ben Davidson
Attorney, Agent, or Firm—Bruce C. Lutz; Dennis O. Kraft

[57] ABSTRACT

Two pulse-width modulated power supplies are synchronized to operate at 180° of phase shift to reduce the peak amplitude of the instantaneous current drawn from the DC input bus. The circuit includes means for disabling the synchronization upon detection of an undervoltage fault condition on the output of either supply. This feature allows frequency programming techniques to be used to provide foldback current limiting for either supply without affecting the operation of the other supply.

14 Claims, 3 Drawing Sheets

SWITCHING MODE POWER SUPPLIES WITH CONTROLLED SYNCHRONIZATION

This invention relates to controlling two switching power supplies to operate synchronously at 180° phase shift, with the provision for disabling the synchronization upon detection of an output undervoltage fault in either supply.

As is well known in the art, a switching power supply converts an unregulated input DC voltage to a regulated DC output voltage by chopping the input voltage, via a suitable power switch, such as a bipolar transistor or power MOSFET, coupling the chopped input to the output through a transformer, and filtering the resultant quasi-rectangular waveform through a low-pass filter.

Switching techniques currently in use in such power supplies commonly employ either frequency modulation, resonant conversion, or pulse-width modulation. In the frequency modulation scheme, the amount of energy to the load is controlled by changing the frequency of the switch transistor. Each switch cycle couples a rectangular pulse of voltage through the transformer to the output filter, but as output load current increases, or as input voltage decreases, the frequency of these pulses increases to compensate for the change in energy requirements. Each pulse has a fixed duration, and thus a fixed amount of energy content. One disadvantage of this scheme is that filtering is often complex and/or difficult. For example, both the input and output filters must be designed to filter these energy pulses over a wide frequency range, and this often results in physically large filters, since they must be designed to accomodate the lowest switching frequency. Also, when more than one power supply is used in a system, problems can result from the addition of output ripple and noise content from each supply, and the beat frequencies which are produced.

Most resonant techniques are very similar to the frequency modulation technique in that the frequency of switch cycles is increased as load increases. The main difference is that the switching waveforms are quasi-sinusoidal rather than rectangular. Thus, resonant techniques suffer from the same disadvantages as the frequency modulation technique.

The majority of switching power supplies produced today use the technique called pulse-width-modulation, PWM, to regulate the output voltage. Pulse-width-modulation control is accomplished by operating the power switch at a fixed frequency that is controlled by a fixed frequency clock, and varying (modulating) the duty cycle of the switch to control the energy delivered to the load. An error amplifier compares a fixed reference to the output bus voltage and controls the width of the pulse required to maintain output voltage regulation. If the input voltage is reduced, the amplifier senses a reduction in the output voltage and commands a longer duty cycle to reestablish regulation. Likewise, if the input voltage increases, the duty cycle is reduced. As load current increases or decreases the duty cycle is again adjusted accordingly.

One of the advantages of the PWM technique is that it has a fixed operating frequency. Such fixed frequency is relatively easy to filter, since the waveform fundamental and harmonic components can be easily calculated, and once calculated, optimum filters can readily be designed to filter the fixed components of the rectangular switching waveforms.

In many systems, more than one switching power supply is used to generate regulated power, whether it is one supply for each required output voltage or redundant supplies to improve reliability. The switching supplies may share a common input EMI filter.

Switching noise can become a problem when more than one switching power supply is used in a system. More specifically, two substantially identical power supplies will run at slightly different frequencies, even when nominal component values used in the clock circuits of the two power supplies are the same. Due to component tolerances, the switching frequency will not be exactly the same in the two power supplies. As the two power supplies operate asynchronously, their switching waveforms sweep from being completely coincidental to completely asynchronous. The sweep rate of the beat frequency established by the two clocks is controlled only by the difference between the two clock frequencies.

When the two power supplies are both operating from the same input bus, the asynchronous switching currents being drawn from the input bus cause an AC voltage to be impressed on the bus due to parasitic inductance and resistance of the bus. This AC voltage must be low enough that it does not cause interference with other equipment on the bus.

One solution to this problem of noise on the bus is to have all equipment on that bus provide its own filter, such that it is no longer susceptible to the bus noise. Another solution is to have each piece of equipment filter its emissions to an acceptable limit. The military and commercial regulatory agencies have each established limits for emissions for each piece of equipment tied to the input bus.

Similarly, the output ripple and noise generated by a switching power supply can cause problems for circuits powered by the output voltage bus. Again, multiple clock frequencies establish beat frequencies, but this time on the output bus.

One approach to reducing the noise on the input and output buses is to synchronize the switching cycles of each power supply so that no beat frequency occurs. Synchronizing the switching cycles such that they are 180° apart has the further benefit that both the RMS current and the peak current drawn by the two supplies are substantially reduced, reducing the total filter requirement.

One method of synchronizing two power supplies is to use a common clock. A disadvantage of this method arises when frequency programming is used to provide foldback current limiting on both outputs. More particularly, both supplies will shift to a lower operating frequency even when only one is overloaded. Frequency programming on the non-overloaded output causes the associated PWM controller to command a longer on-time of the associated switch transistor. Longer on-time is commanded, since, with a constant input voltage, the duty cycle is also constant to maintain output voltage regulation. At a lower switching frequency, the transformer of the non-overloaded power supply may saturate causing extremely high or damaging currents in the power train components. This may cause unnecessary loss of regulation or possibly even catastrophic failure of the otherwise properly functioning output.

Another method of synchronizing two power supplies is to use and synchronize two clocks. A slave clock is caused to sync up to a master in such a way that the two power supplies are synchronized, but in such a way that, depending upon when synchronization occurred, the two switch trasistors may either be turned on at the same time, or they may be turned on alternately. Since the two switch transistors can be simultaneously turned on, and simultaneously drawing current from the input bus, the input filter must be designed to handle the resulting RMS current and peak current.

In accordance with the present invention there is featured the provision of synchronization of two switching power supplies at a 180° phase difference, and of automatic disabling of such synchronization whereupon return to an asynchronous switching relationship between the power supplies is accomplished whenever an undervoltage condition is detected on the output of either supply. These and other features, objects and advantages of the invention will become more apparent upon reference to the following specifications, claims and appended drawings in which:

Figure 1A:
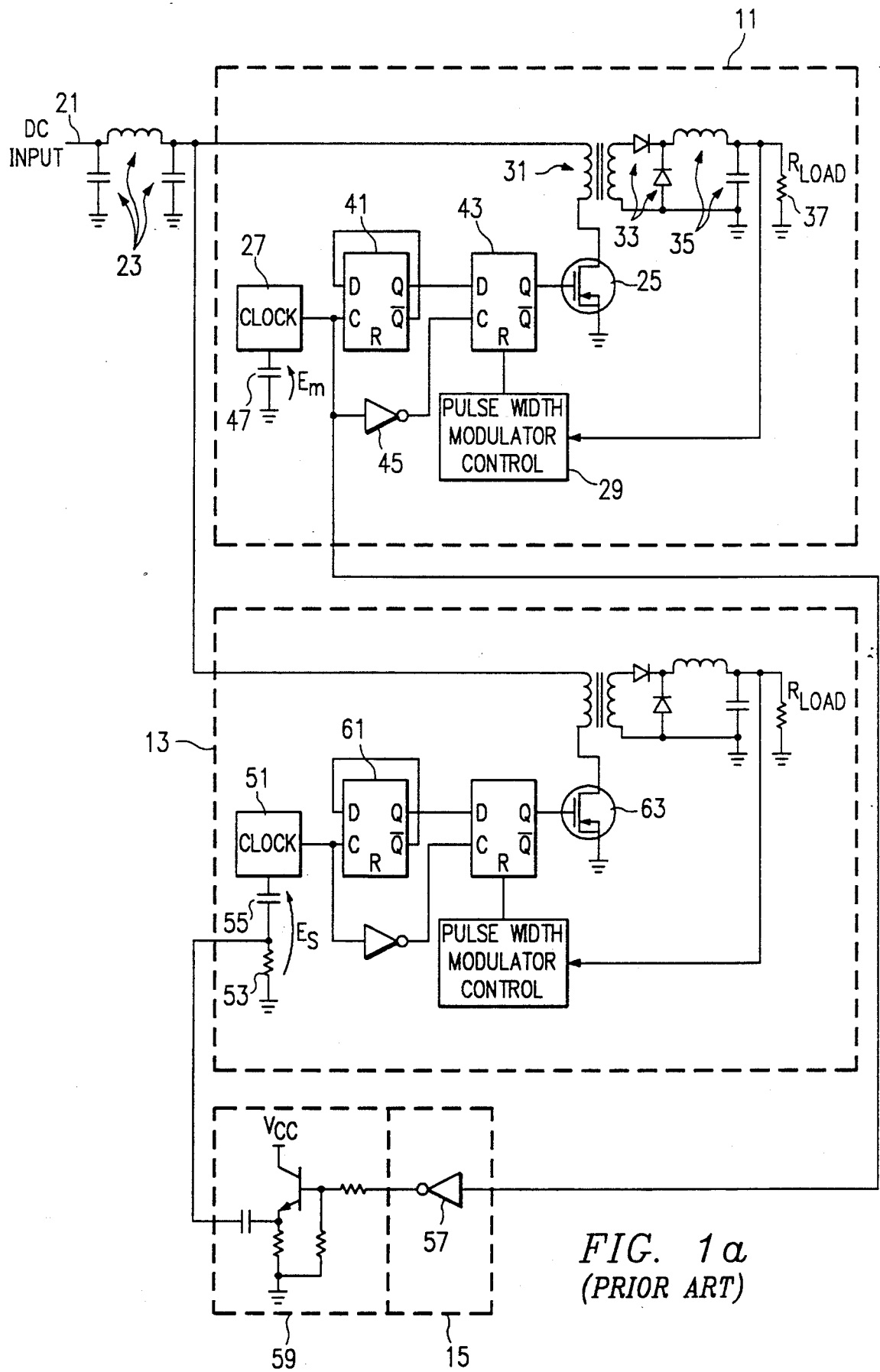
FIG. 1a is a block diagram schematic representating a pair of typical prior art pulse-width modulated power supplies, and a prior art synchronization circuit.
Figure 1B:
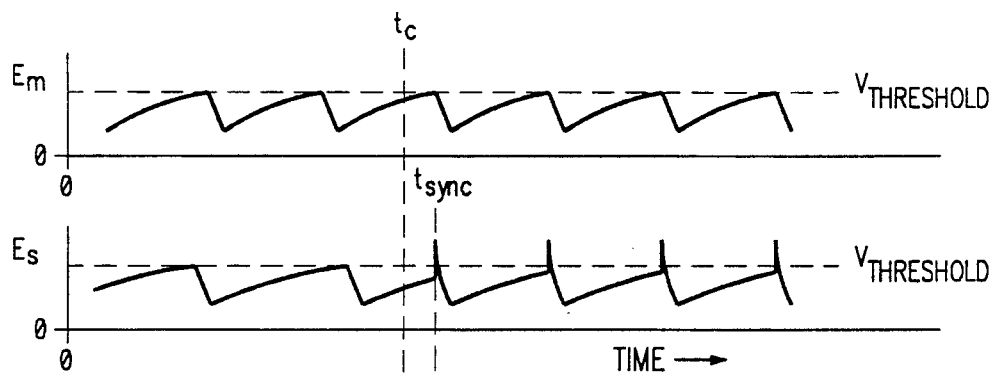
FIG. 1b shows waveforms useful in explaining the operation of the FIG. 1a apparatus.

Turning now to FIGS. 1a and 1b for briefly reviewing the above mentioned "two clock" (master and slave) synchronization method for PWM supplies, two conventional prior art fixed-frequency PWM supplies 11 and 13 are shown interconnected by a prior art synchronization circuit 15. The unregulated DC input voltage on line 21 is filtered by lowpass filter 23. Power switching transistor 25 has an "on" state that is initiated by the clock 27 and that is normally concluded by the PWM control circuit 29. Transformer 31 couples a rectangular pulse of voltage during this "on" state, causing a quasi-rectangular waveform to appear at the transformer secondary. Rectifier 33 and output filter 35 convert this quasi-rectangular waveform to a regulated DC output voltage suitable for driving a load such as 37. Clock 27 outputs a timing signal which runs at twice the switching frequency of the power supply. A clock running at twice the switching frequency is employed so that the flip-flops and inverter can limit the duty cycle of the clock to 50 percent maximum and provide double pulse suppression. The transformer includes a demagnetizing winding for removing magnetization energy from the core to avoid saturation. Since the primary and demagnetizing windings generally have the same number of turns, the duty cycle is limited to a maximum of 50 percent to ensure complete reset of the transformer core operating point. Double pulse suppression is desireable to prevent the transistor from turning on before two clock cycles have passed, so that the output transformer does not saturate when recovering from a fault condition. Delay (D-type) flip-flops 41 and 43, and inverter 45, accomplish frequency division such that the positive-going transition at flip-flop 43 Q output, that corresponds to the turning on of transistor 25, occurs at one half the clock 27 output frequency. The subsequent, negative-going transition at flip-flop 43 Q output (i.e., the transition that corresponds to the turning off of transistor 25), occurs at the first to occur of (i) the reset signal from PWM control circuit 29 or (ii) the next negative-going clock transition from clock 27.

The voltage Em at clock timing capacitor 47 for master clock 27 oscillates at the clock frequency in accordance with a sawtooth waveshape as shown in FIG. 1b.

PWM supply 13 is substantially identical in makeup and operation to supply 11, except that slave clock 51, in its free-running mode, oscillates at a lower frequency than clock 27, and except that a resistor 53 is inserted in series with slave clock timing capacitor 55 so as to provide a place for pulse injection from synchronization circuit 15. Making up synchronization circuit 15 is an inverter 57, receiving input from the master clock 27, and a transistor-implemented pulse shaper 59 receiving output from inverter 57.

The output timing pulses of pulse shaper 59 are inverted with respect to the master clock 27 output, and are injected at the junction of clock timer capacitor 55 and resistor 53.

The operation of the FIG. 1a apparatus can be explained with the aid of FIG. 1b. More specifically, if one assumes that, prior to time $t_c$ in FIG. 1b, the input of inverter 57 was disconnected from master clock 27 output, then the voltage Es would be an oscillatory, free-running sawtooth wave of slightly lower frequency than Em. If one assumes that, at time $t_c$, the input of inverter 57 is connected to the master clock 27 output as illustrated in FIG. 1a, then at the next-following falling-edge transition of master clock 27 output (i.e., $t_{sync}$), and all subsequent ones, a pulse is added to the Es sawtooth, causing the resultant Es to trip the upper threshold, terminating the present clock cycle and starting a new one, and generating slave clock 51 output timing pulses coincident and synchronous with the master clock 27 output signal.

The two power supplies 11 and 13 are thusly synchronized. However, since the master and slave clocks 27 and 51 run at twice the frequency of flip-flops 41 and 61, and at twice the frequency of transistors 25 and 63, the switch transistors 25 and 63 may turn on at the same time, or they may be turned on alternately, depending on the state of flip-flops 41 and 61 when synchronization occurred.

Figure 2:
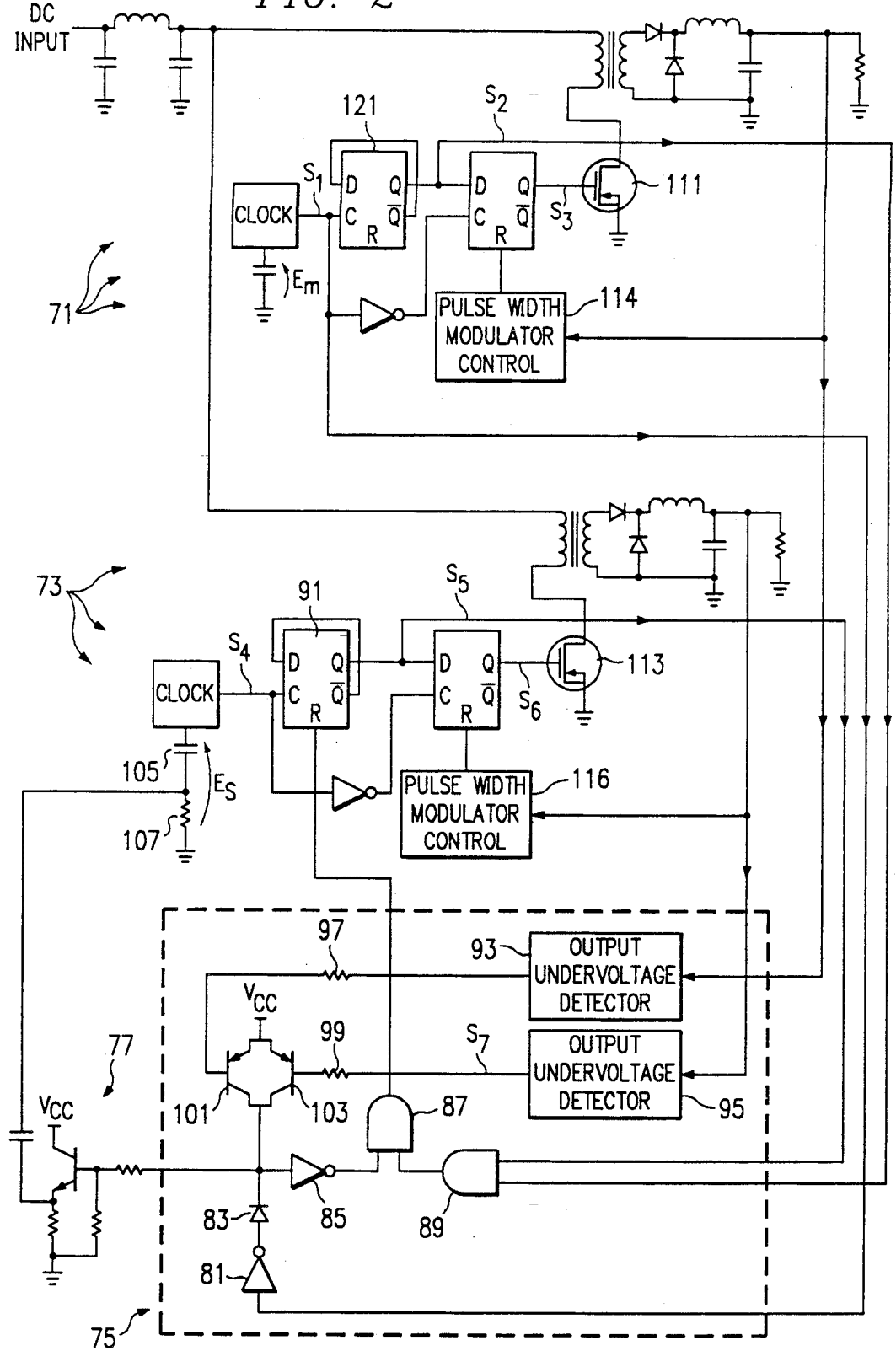
FIG. 2 is a block diagram schematic illustrating the presently preferred embodiment.

Turning now to FIG. 2, the presently preferred embodiment comprises two fixed-frequency PWM power supplies 71 and 73, a synchronization and disable circuit 75, and a pulse shaper 77. Since supplies 71 and 73, and pulse shaper 77, are conventional prior art items and correspond to items 11, 13, and 59, respectively, as explained above and illustrated in FIG. 1a, various details of makeup and operation with respect thereto need not be repeated.

Focusing now on circuit 75, same comprises (i) sync circuitry to insure, when enabled, that the switch transistors transition to "on" state at the same frequency but are never simultaneously turned on, and (ii) disable circuitry to automatically remove the synchronization when an output overload fault is incurred.

In the sync circuitry, an inverter 81 receives as input the master clock output waveform $S_1$, and outputs through a protector diode 83 to a second inverter 85 whose output is in turn inputted to AND gate 87. The other input to AND gate 87 is the output of a second AND gate 89 whose two inputs are $S_2$ and $S_5$; i.e., the Q outputs of the "master clock divide-by-two" D flip-flop 121 and the "slave clock divide-by-two" D flip-flop 91.

The output of AND gate 87 is connected to the reset input of "slave clock divide-by-two" D flip-flop 91.

In the disable circuitry, undervoltage detectors 93 and 95 are connected to, and monitor, the DC voltage outputs of, respectively, supplies 71 and 73. Detectors 93 and 95 have outputs connected, respectively, via series resistors 97 and 99, to the bases of transistors 101 and 103 which are configured as a logic OR circuit. The emitters of both transistors are connected to a bias voltage $V_{cc}$ and the collectors are both connected to the input of inverter 85. The undervoltage detectors 93 and 95 are each a comparator type circuit whose output is high when its input is greater than a reference threshold, and whose output is low when its input is less than the reference threshold.

The input to pulse shaper 77 is connected to the output of diode 83 and the output of pulse shaper 77 is connected, as in the prior art, to the junction of master clock timing capacitor 105 and resistor 107.

Figure 3:
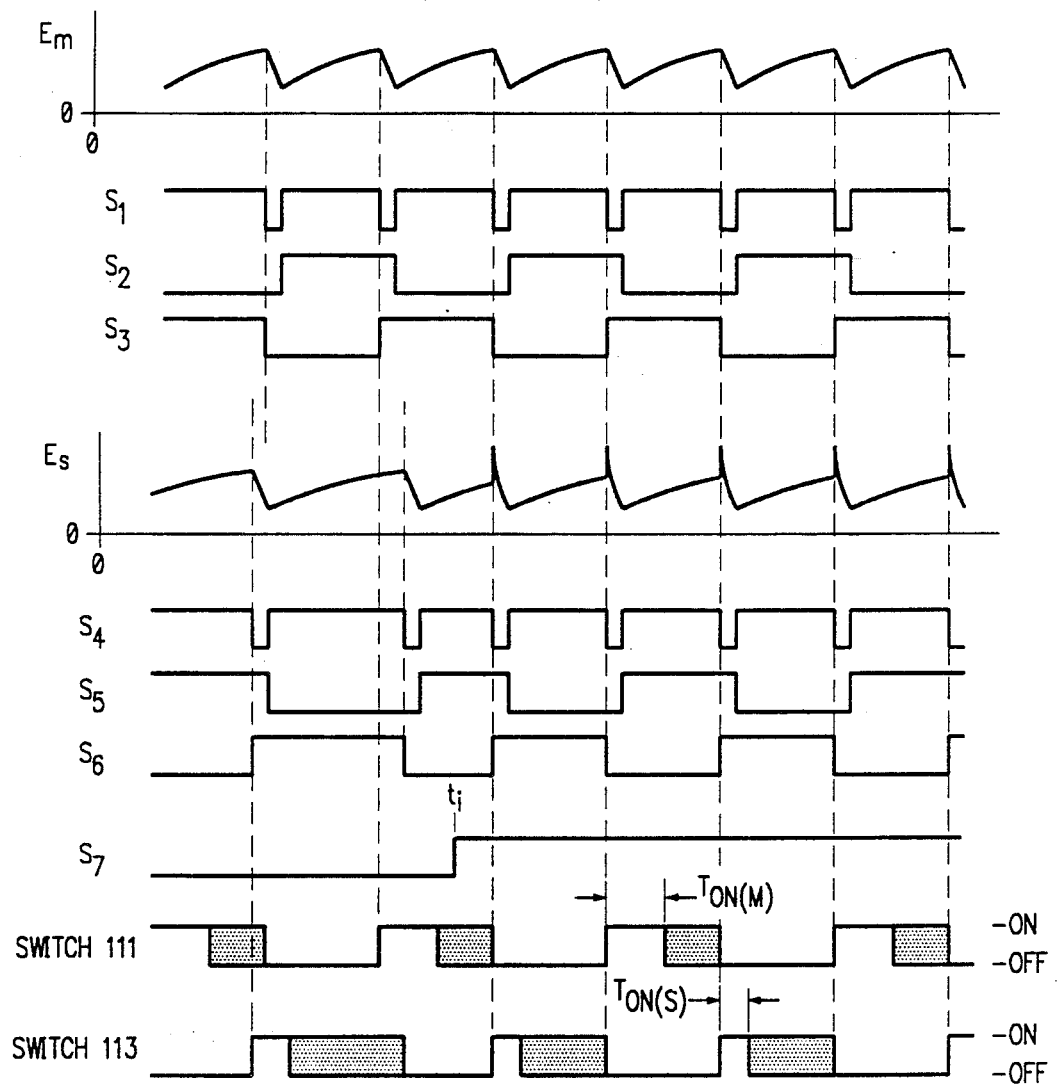
FIG. 3 shows waveforms useful in explaining the operation of FIG. 2 apparatus.

In FIG. 3, the master and slave timing capacitor voltages are referred to as Em and Es, respectively, and the master and slave clock output signals are referred to as $S_1$ and $S_4$, respectively. Master and slave divide-by-two flip-flop outputs are referred to as $S_2$ and $S_5$, respectively, and the control signal inputs to master and slave transistor switches are referred to as $S_3$ and $S_6$, respectively. The output signal of slave supply undervoltage detector 95 is referred to as $S_7$.

Assume that initially the slave output undervoltage detector 95 is sensing an output undervoltage condition on the slave supply, such as may occur during start-up or during an output overload condition, with $S_7$ in the low state. This causes transistor 103 to turn on, forcing the output of inverter 85 low to disable AND gate 87, and inhibiting pulse shaper 77 to disable the synchronization of the slave supply.

With simultaneous reference now to both FIGS. 2 and 3, switch transistors 111 and 113 are caused, as follows, to operate 180° out of phase. More specifically, $S_2$ determines the next state of the master supply switch transistor 111. Similarly, $S_5$ determines the next state of the slave supply switch transistor 113. At time $t_i$ the slave output undervoltage detector 95 goes high, indicating that the output undervoltage condition on the slave supply has ceased to exist. This causes transistor 103 to turn off. With both transistors 101 and 103 in the "off" state, the disabling of AND gate 87 and pulse shaper 77 is removed. Master clock output $S_1$ is thus enabled to pass through inverter 81, blocking diode 83, and inverter 85 to the input of AND gate 87. Furthermore, pulse shaper 77 is enabled to synchronnize the slave clock output $S_4$ with the master clock output $S_1$. Logic AND gate 89 compares $S_2$ and $S_5$, and when both are logic "1" (i.e., when both next states are logic "1"), the output of AND gate 89 is logic "1" to indicate a need to change the state of the slave. The divide-by-two slave flip-flop 91 is reset during the high state of the master clock signal $S_1$ whenever the output of AND gate 89 is high, making $S_5$ 180° out of phase with $S_2$. Consequently, the master and slave transistor switches 111 and 113 turn on 180° out of phase with one another. More specifically, in the normally operating, no-fault condition, $S_2$ and $S_5$ are not simultaneously high so that $S_3$ and $S_6$ are not simultaneously high, and thus, transistors 111 and 113 are not simultaneously turned on.

For purposes of simplification, $S_3$ and $S_6$ are shown without any duty cycle modulation effect (without any pulse-shortening effect) from the PWM control units 114 and 116. There is indicated, however, the operation of switches 111 and 113 under normally operating synchronized conditions. More specifically, switch 111 turns on at the positive-going transition of $S_3$ and stays on for a time $T_{ON(M)}$, where $T_{ON(M)}$ varies between zero and the period of the master clock $S_1$.

Switch 111 turns off at such time to maintain the master supply output voltage in regulation, and remains off until the next positive-going transition of $S_3$.

Switch 113 turns on at the positive-going transition of $S_6$ and stays on for a time $T_{ON(S)}$, where $T_{ON(S)}$ varies between zero and the period of the slave clock $S_4$. Switch 113 turns off at such time to maintain the slave supply output voltage in regulation, and remains off until the next positive-going transition of $S_6$.

During normal operation, each of switches 111 and 113 turns on at the same frequency but such transitions are separated in time by the period of the master (and slave) clock to ensure that the conduction times of the switches do not overlap.

During normal operation, both the master and slave supply outputs are in regulation, and both undervoltage detector outputs reflect same by being in a "high" condition. With both undervoltage detector outputs keeping transistors 101 and 103 in the "off" condition (reflecting normal voltage regulation of both supplies), pulse shaper 77 is enabled to provide synchronization pulses to the slave clock timing capacitor 105 so that $S_4$ synchronizes with $S_1$. Also during normal operation, the master clock output signal $S_1$ is enabled to pass through inverter 81, blocking diode 83, and inverter 85 to the input of AND gate 87. The divide-by-two flip-flop 91 is reset during the high state portion of the master clock signal $S_1$ whenever the output of AND gate 89 is high, keeping $S_5$ 180° out of phase with $S_2$.

During an undervoltage fault condition at the slave supply output, such as occurs when the output is being current limited due to an overload, the undervoltage detector 95 senses a low output voltage and $S_7$ goes low. This causes transistor 103 to turn on, forcing the output of inverter 85 low to disable AND gate 87 and, additionally, inhibiting synchronization pulses from being delivered via pulse shaper 77 to slave timing capacitor 105. With synchronization pulses from pulse shaper 77 inhibited, the slave clock operates at its free running frequency. As long as the output of inverter 85 is low, no reset pulses are delivered to the slave circuit divide-by-two flip-flop 91. The master and slave switch transistors 111 and 113 therefore turn on asynchronously, controlled only by clock outputs $S_1$ and $S_4$, respectively.

During an undervoltage fault condition of the master supply output, such as occurs when the output is being current limited due to an overload, the undervoltage detector 93 for the master supply senses a low output voltage and causes transistor 101 to turn on, thereby forcing the output of inverter 85 low to disable AND gate 87 and, additionally, inhibiting synchronization pulses from being delivered to capacitor 105. With synchronization pulses from pulse shaper 77 inhibited, the slave clock operates at its free running frequency. As long as the output of inverter 85 is low, no reset pulses are delivered to slave circuit flip-flop 91. The master and slave transistors 111 and 113 therefore operate asynchronously.

Blocking diode 83 protects the output of inverter 81 when either transistor 101 or 103 is turned on.

The ability to disable the synchronization is desirable if frequency programming techniques are employed to provide foldback current limiting for either supply. For example, when frequency programming is used, an overload of the master power supply output will result in the master's operating frequency being programmed lower. Synchronizing the slave supply to a lower frequency is not desirable, as the slave clock cycles would be terminated prematurely. This would cause switch on-time intervals to terminate prematurely, or to be skipped completely. This erratic clock duty cycle would cause instability in the switching frequency, higher currents in the power train components, and might cause loss of regulation on the otherwise normally functioning slave power supply output. In the event of an overload on the slave power supply output, continuing efforts by the circuit to synchronize the slave with the normally functioning master would interfere with the frequency programming of the slave circuit.

Any number of power supplies with these features can be connected to balance the switch current drawn from the input during the two defined conduction times for the respective switch transistors. Any system can be configured to draw balanced switch current from the input if phased properly with the circuitry.

Thus while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. Power supply apparatus comprising:
   a) a first, fixed-frequency, pulse width modulated DC power supply including (i) a first power switch, and (ii) circuit first means for controlling on-time, and thus duty cycle, of said first power switch so as to maintain voltage regulation of the output of said first power supply, the maximum allowable duty cycle of said first switch being 50 percent;
   b) a second, fixed-frequency, pulse width modulated DC power supply including (i) a second power switch, and (ii) circuit second means for controlling on-time, and thus duty cycle, of said second power switch so as to maintain voltage regulation of the output of said second power supply, the maximum allowable duty cycle of said second switch being 50 percent; and,
   c) circuit third means, connected to said first and second supplies, for (i) causing synchronization of said first and second supplies in such a way that any overlap of the on-times of the first and second power switches is prevented during synchronization for all allowable values of the two duty cycles, and (ii) automatically disabling the synchronization of said first and second supplies in response to an output undervoltage condition of at least one of the first and second supplies;
   d) the on-times of said first and second switches, and thus the duty cycles thereof, being capable of being unequal to one another during synchronization.

2. Apparatus as defined in claim 1 wherein the automatic disabling of synchronization occurs in response to an output undervoltage condition of the first supply, and also occurs in response to an output undervoltage condition of the second supply.

3. Apparatus as defined in claim 2 wherein said automatic disabling of synchronization is deactivated when no undervoltage condition remains, so that the synchronization is reinstated.

4. Apparatus as defined in claim 3 wherein said circuit first means includes a first clock, and said circuit second means includes a second clock.

5. Apparatus as defined in claim 4 wherein the on-time of the first power switch is less than or equal to the period of the first clock and wherein the on-time of the second power switch is less than or equal to the period of the second clock.

6. Apparatus as defined in claim 5 wherein, when synchronization is enabled, the periods of the first and second clocks are the same, and the beginning of the on-time of the first power switch is separated in time from the beginning of the on-time of the second power switch by the period of the first clock.

7. Apparatus as defined in claim 6 wherein, the power supply apparatus includes a single unregulated DC source which contributes to both the first supply output and the second supply output.

8. Apparatus as defined in claim 4 wherein, when synchronization is enabled, the periods of the first and second clocks are the same, and the beginning of the on-time of the first power switch is separated in time from the beginning of the on-time of the second power switch by the period of the first clock.

9. Power supply apparatus comprising:
   a) a first, fixed-frequency, pulse width modulated DC power supply including (i) a first power switch, and (ii) circuit first means for controlling on-time, and thus duty cycle, of said first power switch so as to maintain voltage regulation of the output of said first power supply, the maximum allowable duty cycle of said first switch being 50 percent, said circuit first means including (I) a master clock means for outputting a master timing signal having a master period and (II) a master divide-by-two circuit for outputting a divided master timing signal whose period is twice the master period;
   b) a second, fixed-frequency, pulse width modulated DC power supply including (i) a second power switch, and (ii) circuit second means for controlling on-time, and thus duty cycle, of said second power switch so as to maintain voltage regulation of the output of said second power supply, the maximum allowable duty cycle of said second switch being 50 percent, said circuit second means including (I) a slave clock means for outputting a slave timing signal having a slave period and (II) a slave divide-by-two circuit for outputting a divided slave timing signal whose period is twice the slave period;
   c) circuit third means, connected to the master clock means and the master and slave divide-by-two circuits, for causing synchronization pulses, of a period equal to the master period, to be delivered to the slave clock means such that the slave period becomes equal to the master period, and for causing the slave divide-by-two circuit to be reset so that the divided master and divided slave timing signals are 180° out of phase, and so that the beginning of the first power switch on-time is 180° out of phase with the beginning of the second power switch on-time whereby overlapping of power switch on-times is prevented during synchronization for all allowable values of the two duty cycles; and d) circuit fourth means, connected to said first and second supplies, and to said third means, for automatically disabling, when an undervoltage condition is detected on the output of either the first or second supplies, (i) the synchronization pulses to the slave clock means and (ii) the resetting of the slave divide-by-two circuit;

e) the on-times of said first and second switches, and thus the duty cycles thereof, being capable of being unequal to one another during synchronization.

10. Power supply apparatus comprising:

a) a first, fixed-frequency, pulse width modulated power supply including (i) a first power switch, and (ii) circuit first means for controlling on-time, and thus duty cycle, of said first power switch so as to maintain voltage regulation of the output of said first power supply, the maximum allowable duty cycle of said first switch being 50 percent, said circuit first means including (I) a master clock means for outputting a master timing signal having a master period and (II) a master divide-by-two circuit for outputting a divided master timing signal whose period is twice the master period;

b) a second, fixed-frequency, pulse width modulated power supply including (i) a second power switch, and (ii) circuit second means for controlling on-time, and thus duty cycle, of said second power switch so as to maintain voltage regulation of the output of said second power supply, the maximum allowable duty cycle of said second switch being 50 percent, said circuit second means including (I) a slave clock means for outputting a slave timing signal having a slave period and (II) a slave divide-by-two circuit for outputting a divided slave timing signal whose period is twice the slave period;

c) circuit third means, connected to the master clock means and the master and slave divide-by-two circuits, for causing synchronization pulses, of a period equal to the master period, to be delivered to the slave clock means such that the slave period becomes equal to the master period, and for causing the slave divide-by-two circuit to be reset so that the divided master and divided slave timing signals are 180° out of phase, and so that the beginning of the first power switch on-time is 180° out of phase with the beginning of the second power switch on-time; and d) circuit fourth means, connected to said first and second supplies, and to said third means, for automatically disabling, when an undervoltage condition is detected on the output of either the first or second supplies, (i) the synchronization pulses to the slave clock means and (ii) the resetting of the slave divide-by-two circuit;

e) the on-times of said first and second switches being capable of being different from one another during synchronization; the circuit third and fourth means comprising:

first and second AND gates;
first and second inverters;
first and second undervoltage detectors;
a logic OR circuit comprising two suitably interconnected transistors; and
a diode;

said first AND gate connected to the outputs of the master divide-by-two circuit and the slave divide-by-two circuit;
said first inverter connected to the output of the master clock means;
said diode connected to the output of the first inverter;
said second inverter connected to the output of the diode;
said second AND gate connected to the outputs of the first AND gate and the second inverter;
said second AND gate having output connected to reset the slave divide-by-two circuit;
the diode having output connected for effecting said synchronization pulses;
said first and second undervoltage detectors having inputs connected to the outputs of said first and second supplies, respectively;
said logic OR circuit connected to the outputs of the first and second undervoltage detectors and for outputting, to the junction of the diode and the second inverter, whenever either or both of the first and second undervoltage detectors detects a low voltage condition on its input, a signal preventing both the synchronization of the clocks and the resetting of the slave divide-by-two circuit.

11. A method of operating first and second pulse width modulated power supplies having, respectively, (i) first and second clocks, (ii) first and second power switches each capable of on and off states, and (iii) first and second DC outputs, said method comprising:

a) synchronizing the first and second clocks such that turn-on transitions of said first power switch are at the same frequency as, but phase shifted 180° relative to, turn-on transitions of the second power switch, the duration of the on state of the first power switch being capable, during synchronization, of being unequal to the duration of the on state of the second power switch, and the on states of the first and second power switches being prevented from any overlapping of one another during synchronization; and b) disabling the synchronization when at least one of the first and the second DC outputs is overloaded.

12. The method as defined in claim 11 and including reinstating the synchronization when both DC outputs are no longer overloaded.

13. Apparatus comprising:

first and second pulse width modulated power supplies having, respectively, (i) first and second clocks, (ii) first and second power switches each capable of on and off states, and (iii) first and second DC outputs; and circuit means for (a) synchronizing the first and second clocks such that turn-on transitions of said first power switch are at the same frequency as, but phase shifted 180° relative to, turn-on transitions of the second power switch, the duration of the on state of the first power switch being capable, during synchronization, of being unequal to the duration of the on state of the second power switch, and the on states of the first and second power switches being prevented from any overlapping of one another during synchronization, and (b) automatically disabling the synchronization when at least one of the first and the second DC outputs is overloaded.

14. Apparatus as defined in claim 13 wherein said circuit means automatically reinstates the synchronization when both DC outputs are no longer overloaded.

* * * * *